H. M. LIESE.
APPARATUS FOR RECOVERING HEAT FROM HOT SOLUTIONS.
APPLICATION FILED JAN. 23, 1911.
1,184,359.
Patented May 23, 1916.
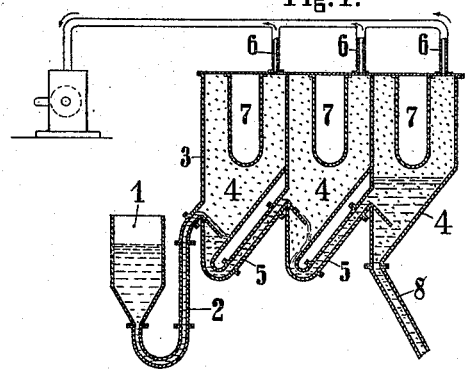
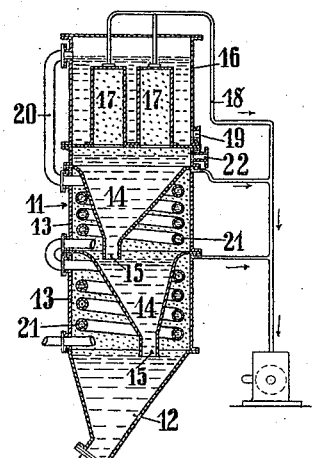
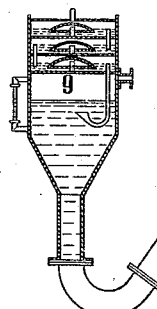

UNITED STATES PATENT OFFICE.

HENDRIK MATHŸS LIESE, OF HAMBURG, GERMANY.

APPARATUS FOR RECOVERING HEAT FROM HOT SOLUTIONS.

1,184,359.   Specification of Letters Patent.   Patented May 23, 1916.

Application filed January 23, 1911. Serial No. 604,151.

*To all whom it may concern:*

Be it known that I, HENDRIK MATHŸS LIESE, a citizen of the German Empire, residing at Hamburg, Germany, have invented certain new and useful Improvements in Apparatus for Recovering Heat from Hot Solutions, of which the following is a specification.

The recovery of the heat carried off in industrial waste water by means of heat exchange was hitherto carried out in such a manner, that the heat-transmitting surfaces were wetted directly by the heat-transferring waste water, all cavities being avoided as far as possible. This method is practical only as long as the waste water is clear and may be cooled without producing a precipitate. If, however, as is generally the case with industrial waste water, the waste water contains solid substances in suspension, or if its cooling will produce a precipitate, the heat-transmitting surfaces will be soon incrusted with these substances and lose considerably in their conductive power. In addition to the losses in heat caused thereby, there result stoppages in the service caused by the necessity of frequent cleaning of the heat transmitting surfaces, which cleaning consumes both time and labor.

With the object of avoiding this drawback, the heat of the waste water is, according to the present invention, conveyed to the heat-transmitting surfaces by means of steam, which is generated from the waste water by a reduction of the pressure.

It is not new to generate steam from hot waste water by reducing the pressure. Hitherto this was employed to utilize the steam as driving medium in a turbine. This previously-employed method, however, allows of recovering only a small part of the heat contained in the waste water, whereas the present new method of employing the steam for transferring the heat of waste water to the heat-exchanging surfaces without any incrustation being formed on the latter admits of very extensive utilization of the waste water heat in a very advantageous manner. By the result of a very extensive recovery of the waste heat by exchange without any stoppages or losses, which were hitherto connected with such heat exchange, a considerable improvement is obtained from an engineering point of view.

The process for instance can be used for utilizing the heat, which is contained in the gas water of the ammonia distillation, such water containing lime. This gas water comes from the distilling apparatuses in a hot state and is to serve for preheating fresh gas water coming from the gas plants, before this gas water is introduced into the distilling apparatus. If the hot waste water coming from the distilling apparatuses would be brought into direct contact with the heat transmitting surfaces, which are to preheat the fresh gas water, such surfaces would be incrustated with the suspended particles in the waste water within a short time, and the further heat transmission would be interfered with. Therefore according to the present invention the heat contained in the waste water is not utilized by direct contact with the heat transmitting surfaces, but in the shape of steam developed under vacuum. The vacuum is necessary in order to effect the development of steam at all.

The heat from the waste liquors in the ammonia-soda process can also be utilized in the manner above outlined for the lime-containing waters above referred to. The waste water coming from the distilling apparatuses of this latter process can likewise be utilized for preheating the ammonia containing liquid to be distilled.

In the accompanying drawing two constructional forms of arrangements for carrying out my invention are exemplified in a diagrammatical manner.

In the arrangement according to Figure 1 the hot waste water is contained in a conical container 1, which communicates by means of a U-shaped pipe 2 rising from its lowest point, with the heat exchange apparatus 3. The latter is composed of a plurality, say three, adjoining evaporating and exchanging chambers 4, in such a manner that the lowest point of the preceding chamber communicates by a pipe 5 with a higher section of the following chamber. Each chamber communicates at its top by means of a pipe 6 with the apparatus for producing a vacuum. In each chamber the heat-exchanging surfaces 7 are arranged in the space above the inlet of the pipes 2, 5, 5 admitting the liquid. From the last chamber the water escapes through a pipe 8, leaving this pipe at its lowest point.

When the arrangement is started, the liquid will follow the vacuum and pass from one chamber into the other. In each chamber a part of the liquid will be evaporated and the steam thus generated will fill the upper part of the chamber, where it will come into heat-exchanging contact with the walls 7. From the last chamber the liquid may be drawn off through pipe 8 according to requirement, either by gravity or by pumps. The U-shaped pipe and the pipes 5 serve as water seals and the pressures in the various chambers differ by the height of the water columns of the pipes.

Under the influence of the reduction of the pressure a comparatively great generation of steam is obtained within the pipes 2, 5, 5, and the water column in the pipe is divided by intermediate bubbles of steam, so that the water will travel in intermittent gushes from chamber to chamber, whereby simultaneously a deposit of suspended matter or precipitates is prevented. This intermittent motion of the water is further assisted by the unavoidable disproportion between the pressure in the several chambers and the exchange of heat. The pressure depends on the temperature of the water; the efficiency of the several chambers depends on the difference between the temperature of the steam and the liquid, vaporous or gaseous substances to be heated. Every non-uniformity will cause fluctuations, whereby the pressures and the movement of the fluid will be correspondingly affected. Such intermittent and fluctuating movement of the waste water admits of making the chambers in form of continuously working autoclaves with conical shaped bottom and to empty them at their lowest point. Contrary to the method hitherto employed for preventing deposits consisting in stirring up the water by means of the steam, the latter is here allowed to remain in the autoclave and it is prevented from being carried along with the water.

In the constructional form according to Fig. 2, 9 is a vessel with a conical bottom which communicates by means of a U-shaped vertical pipe 10 with the heating or heat exchanging apparatus fitted at a higher level. This apparatus has a conical bottom 12 with an eccentric opening and consists of a plurality of evaporating chambers arranged in form of a column, so that each of the chambers consists of an upper cylindrical portion 13 and a conical bottom 14, which projects into the cylindrical part of the lower chamber and ends in a short open tube 15, which dips into the conical bottom of this chamber. The short tubes 15 are eccentrically arranged in such a manner that the tube of the lower chamber alternates with the tube of the upper chamber. The top chamber is closed with a lid, on which is fitted a vessel 16 closed at the top, and having therein chambers 17, 17 communicating with the evaporating chamber. The chambers 13, 13 and 17 communicate by means of pipes 18 with the apparatus for producing a vacuum. The container 16 receives the fluid to be heated from below through a pipe 19. At the top it communicates by a pipe 20 with a coiled pipe 21, which traverses the chambers 13 and emerges from the bottom chamber at its warmest point. From the top chamber the cooled fluid passes off through a pipe 22 opening above the conical bottom.

After a vacuum has been established, the waste water rises with an intermittent motion, bubbles of steam being continuously liberated therefrom through the U-shaped pipe 10 and the chambers; the vapors collect in the chambers 13, in which the coiled pipe produces the exchange of heat and at the upper end of the column in the chambers 17, through the walls of which the heat is exchanged.

It is not absolutely necessary to connect a suction pipe to each chamber, as the fluid will itself act as a pump. The heat exchanging surfaces 7 are shown in Fig. 1 as extending into the upper or steam portion of the chambers 4, and in Fig. 2 as chambers 17, 17 and pipes 21, 21. Obviously the walls of these pipes or chambers may also be considered as the walls of the steam chamber, and the term "heat exchanging walls" as used in the claims is intended to apply to all these forms of devices, as well as to other forms of devices in which any medium is heated by exchange of heat with the steam through a conducting wall.

I claim:

1. An apparatus for recovering heat from waste hot liquids, consisting of a series of chambers having unobstructed self-draining bottom sections, each communicating with the succeeding one of the series, means for maintaining a diminished pressure in the upper or steam portion of each chamber, said chambers having heat exchanging walls in said upper portions.

2. An apparatus for recovering heat from waste hot liquids consisting of a series of chambers having unobstructed self-draining bottom sections, conduits of relatively small diameter connecting the bottom portions of said chambers, means for maintaining a diminished pressure in the upper or steam portion of each chamber, said chambers having heat exchanging walls in such upper portions.

3. An apparatus for recovering heat from waste hot solutions, comprising a container for heated solutions, a series of heat-exchanging chambers having unobstructed lower fluid-containing compartments connected in series with each other and upper vapor-containing spaces, a conduit connecting said container with one of said compartments, means for maintaining a dim inished pressure in said vapor-containing spaces, means in said spaces for transferring heat to a body to be heated, and means for circulating the waste hot solutions through said fluid-containing compartments.

4. An apparatus for recovering heat from hot solutions containing incrusting matter consisting of a vessel having an unobstructed bottom section adapted to receive hot solution and a top section containing heat-exchanging surfaces, a conduit for admission of hot solution to said vessel and means for exhausting vapors and gases from the upper part of the vessel holding the hot solution.

5. An apparatus for recovering heat from hot solutions containing incrusting matter consisting of a vessel having a bottom section adapted to receive hot solution, said bottom section free from auxiliary surfaces contacting with said solution, and a top section containing heat exchanging surfaces, a conduit for admission of hot solution to said vessel and means for exhausting vapors and gases from the upper part of the vessel holding the hot solution.

In testimony whereof, I affix my signature in presence of two witnesses.

HENDRIK MATHŸS LIESE.

Witnesses:
　ERNEST H. L. MUMMENHOFF,
　IDA CHRIST. HAFERMANN.

Copies of this patent may be obtained for five cents each, by addressing the "Commissioner of Patents, Washington, D. C."